(12) United States Patent
Le Quere

(10) Patent No.: US 6,517,124 B1
(45) Date of Patent: Feb. 11, 2003

(54) DEVICE FOR CONNECTING A PIPE END TO A MEMBER

(75) Inventor: Philippe Le Quere, Betton (FR)

(73) Assignee: Legris S.A., Rennes (FR)

( * ) Notice: Subject to any disclaimer, the term of this patent is extended or adjusted under 35 U.S.C. 154(b) by 0 days.

(21) Appl. No.: 09/669,145

(22) Filed: Sep. 27, 2000

(30) Foreign Application Priority Data

Sep. 27, 1999 (FR) .............................................. 99 11989

(51) Int. Cl.⁷ ................................................ F16L 17/00
(52) U.S. Cl. ...................................... 285/340; 285/379
(58) Field of Search .......................... 285/39, 322, 340, 285/379, 380

(56) References Cited

U.S. PATENT DOCUMENTS

| | | | | |
|---|---|---|---|---|
| 3,656,771 A | * | 4/1972 | Stout ........................... | 285/379 |
| 4,655,486 A | * | 4/1987 | Tarnay et al. ................ | 285/340 |
| 4,717,179 A | | 1/1988 | Haberstock et al. | |
| 4,749,214 A | * | 6/1988 | Hoskins et al. .............. | 285/39 |
| 4,964,657 A | * | 10/1990 | Gonzales ..................... | 285/340 |

FOREIGN PATENT DOCUMENTS

| | | |
|---|---|---|
| DE | 9204939 | 7/1992 |
| DE | 92049397 | 9/1992 |
| EP | 0060310 | 9/1982 |
| GB | 2177174 | 1/1987 |

* cited by examiner

*Primary Examiner*—Lynne H. Browne
*Assistant Examiner*—Aaron Dunwoody
(74) *Attorney, Agent, or Firm*—Birch, Stewart, Kolasch & Birch, LLP

(57) ABSTRACT

A device for connecting a pipe end to a member. The device has a tubular endpiece with a first end secured to the member and a second end through which the pipe end can be engaged in the endpiece. The endpiece is provided internally with an abutment against engagement of the pipe end and a way for securing the pipe end in leakproof manner inside the endpiece, and a sleeve that is elastically deformable at least in an axial direction. The sleeve is fixable axially in the endpiece and, towards the first end of the endpiece, has an end provided with an annular internal shoulder for coming into abutment against an end face of the pipe end so as to form the abutment against engagement of the pipe end.

9 Claims, 3 Drawing Sheets

FIG_1

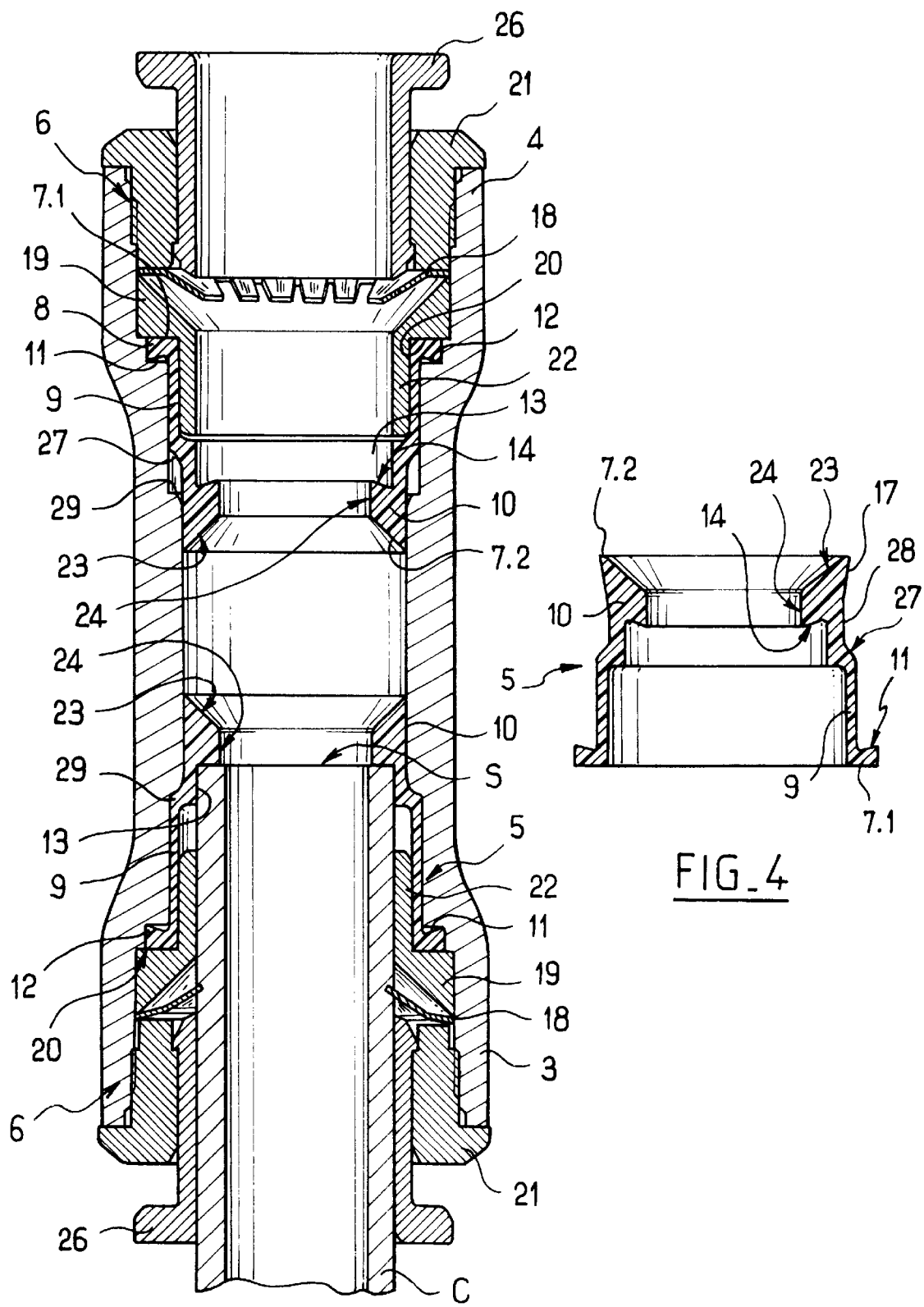

DEVICE FOR CONNECTING A PIPE END TO A MEMBER

The present invention relates to a device for connecting one end of a pipe to a member of a circuit for conveying fluid under pressure, such as another pipe, a tank, a pump, . . .

BACKGROUND OF THE INVENTION

Such a connection device generally comprises a tubular endpiece secured to the member and provided with an internal annular shoulder against which the end of the pipe comes into abutment, and means for securing said end in leakproof manner within the tubular endpiece. These means comprise a claw washer mounted in the tubular endpiece and an O-ring received in the tubular endpiece between the shoulder and the claw washer.

While the pipe end is being coupled, the end of the pipe is engaged in the tubular endpiece until it comes into abutment against the annular shoulder. The claws are then pressed against the outside surface of the pipe end, and the O-ring is in close contact with the outside surface of the pipe end, thereby making the coupling leakproof. When the circuit in which the connection device is installed is itself put under pressure, the assembly clearances of the components of the connection device have the consequence in particular of the end of the pipe backing off a little under the effect of the pressure before the claws that are biting into the outside surface of the end of the pipe become wedged. Penetration of the claws into the outside surface of the pipe also causes the pipe to back off. There thus exists a gap between the end of the pipe and the annular shoulder, and also clearance between the pipe and the endpiece.

While a liquid is circulating through the coupling zone, some of the liquid runs the risk or penetrating into said gap and into the portion of this clearance defined by the sealing ring, and said liquid runs the risk of remaining constantly stagnant therein. This gap thus constitutes a liquid retention zone. With food liquids, the liquid retained in retention zones spoils and pollutes the liquid that circulates subsequently through the coupling zone. In addition, these retention zones are of relatively small dimensions which makes them particularly difficult to clear.

There thus exists a need that has not yet been resolved in convenient manner for a connection device that provides a leakproof coupling while limiting or even eliminating liquid retention zones.

OBJECTS AND SUMMARY OF THE INVENTION

To this end, the invention provides a device for connecting a pipe end to a member, the device comprising a tubular endpiece having a first end secured to the member and a second end through which the pipe end can be engaged in the endpiece, the endpiece being provided internally with an abutment against engagement of the pipe end and means for securing the pipe end in leakproof manner inside the endpiece, these means including a sealing element and means for retaining the pipe end inside the endpiece, the connection device comprising a sleeve that is elastically deformable at least in an axial direction, which sleeve has means for fixing it axially in the endpiece and, towards the first end of the endpiece, an end provided with an annular internal shoulder for coming into abutment against an end face of the pipe end so as to form the abutment against engagement of the pipe end.

Thus, the end face at the end of the pipe in the connected position bears against the annular internal shoulder of the sleeve, causing the sleeve to be lengthened elastically, thereby maintaining close contact between the annular internal shoulder and the end face at the end of the pipe. The annular internal shoulder of the sleeve forms a kind of resilient abutment on engagement of the end of the pipe in the endpiece, thereby serving firstly to make it possible to omit the internal shoulder secured to the endpiece of a prior art connection device, thereby simplifying the structure of the connection device and facilitating cleaning, and secondly to compensate for the end of the pipe backing off when the circuit is put under pressure, with this being done by means of the sleeve relaxing elastically, thereby limiting any risk of retention zones forming.

In a particular embodiment, the sleeve is arranged to form the sealing element and it preferably comprises a cylindrical internal surface adjacent to the internal shoulder for pressing against an outside surface of the end of the pipe, the diameter of the cylindrical internal surface being slightly less than the outside diameter of the end of the pipe, and/or the sleeve has an outer frustoconical surface in the vicinity of the cylindrical inner surface, the frustoconical surface tapering towards the first end of the endpiece to co-operate with an inner surface of complementary shape of the endpiece and form means for radially shrinking the cylindrical inner surface of the sleeve.

The sleeve thus performs the two functions of constituting a resilient abutment and of constituting a sealing element. The connection device is thus simple in structure and has a relatively small number of parts.

BRIEF DESCRIPTION OF THE DRAWINGS

Other characteristics and advantages of the invention will appear more clearly in the light of the following description of particular, non-limiting embodiments of the invention.

Reference is made to the accompanying drawings, in which:

FIG. 1 is a longitudinal section view through a connection device of the invent on;

FIG. 3 is a view analogous to FIG. 1 of a connection device forming a variant embodiment; and FIG. 4 is a view analogous to FIG. 2 of the sleeve of this variant.

MORE DETAILED DESCRIPTION

With reference to the figures, the connection device of the invention as described herein is for coupling together two pipe ends C in a liquid transport circuit. The connection device could also be arranged to enable a pipe end to be connected to a member for delivering or receiving fluid, e.g. a pump, a tank, etc.

Figure 1:
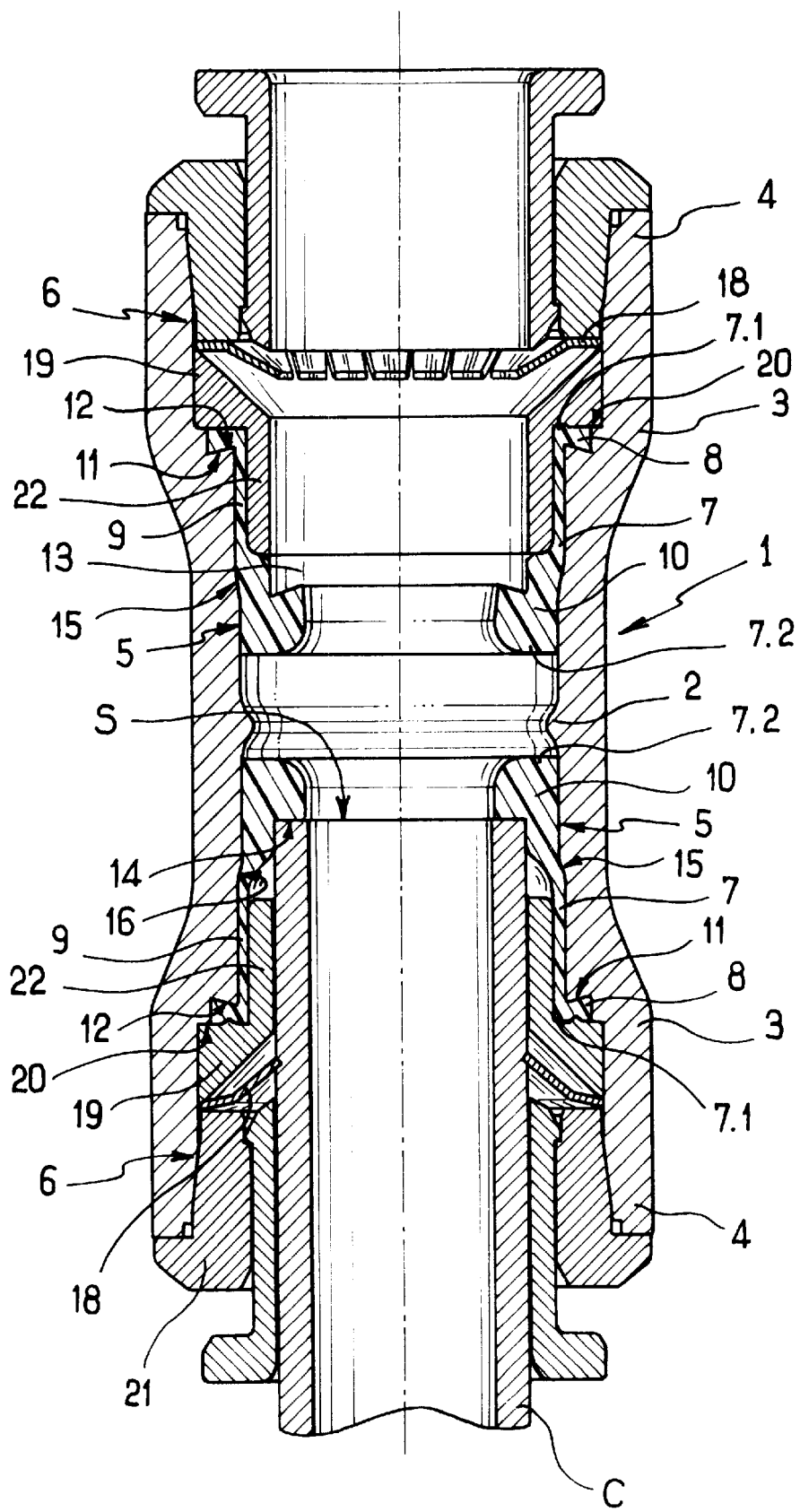
Figure 2:
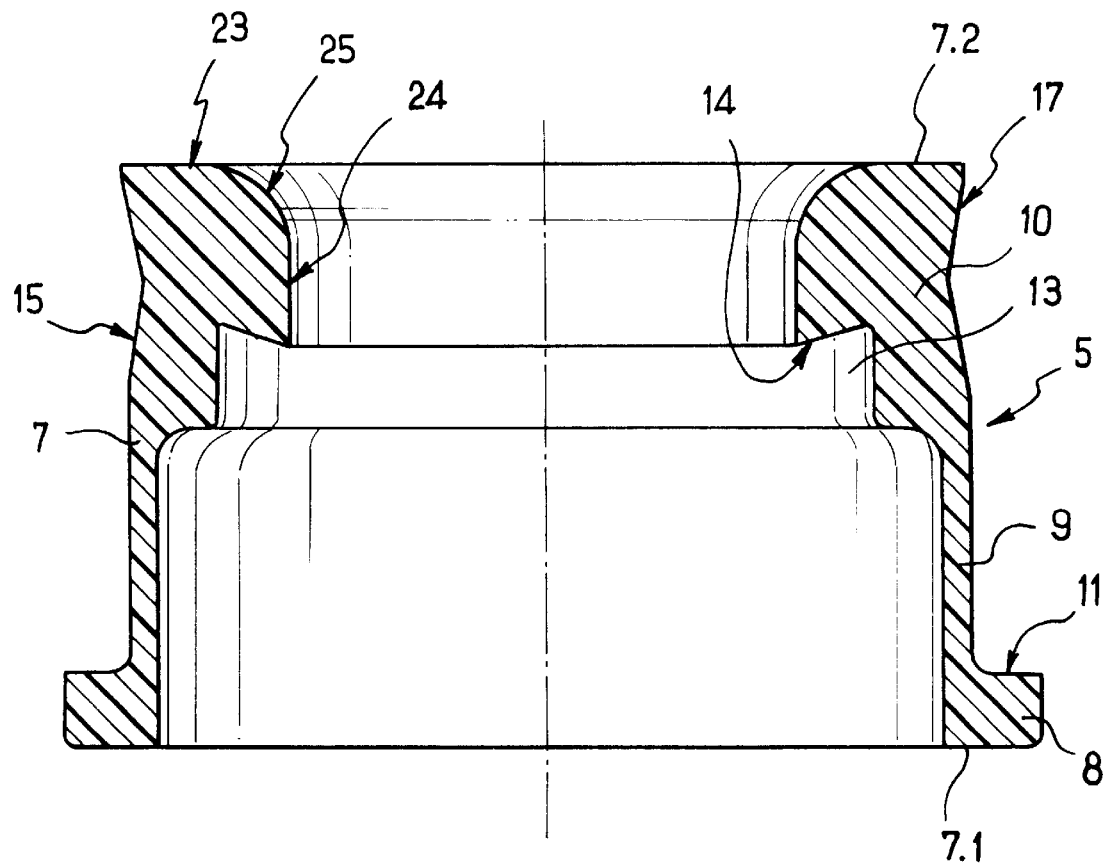
FIG. 2 is a longitudinal section view of the sleeve forming the resilient abutment.

With reference more particularly to FIGS. 1 and 2, the connection device comprises a tubular endpiece given overall reference 1 and having a central annular swelling 2 projecting into the inside thereof with an inside diameter that is slightly smaller than the inside diameter of the endpiece 1 so as to subdivide the endpiece 1 into two identical sections 3 each for coupling to a respective pipe end C. Each coupling section 3 has a free end 4 remote from the other coupling section 3 through which it receives the pipe end C that is to be inserted into the coupling section 3.

Each coupling section 3 is provided internally with a resilient abutment 5 against further engagement of the pipe end C in the coupling section 3 in question together with retaining means given overall reference 6 for retaining the pipe end C in the engaged position. The retaining means 6 extend from beside the free end 4 of the coupling section 3 in question, and the resilient abutment 5 is disposed between the retaining means 6 and the swelling 2 of the endpiece 1.

The resilient abutment 5 comprises a sleeve 7 extending inside the endpiece 1 coaxially therewith. The sleeve 7 is made of an elastically deformable material such as an elastomer.

At an end 7.1 disposed beside the retaining means 6, the sleeve 7 comprises an anchor ring 8 for anchoring the sleeve 7 in the endpiece 1, which ring is connected by a tubular wall 9 which is elastically deformable in the axial direction to a tubular body 10 forming an end 7.2 of the sleeve 7 that is located beside the swelling 2. The ring 8 and the tubular wall 9 have an inside diameter that is identical to or greater than the outside diameter of the pipe end C.

The anchor ring 8 has an annular outer shoulder 11 in abutment in the direction in which the pipe end C is inserted into the endpiece 1 against a corresponding annular surface 12 of the coupling section 3 in question of the endpiece 1. The ring 8 forms means for fixing the sleeve 7 axially in the endpiece 1.

The body 10 has a chamber 13 of diameter slightly smaller than the outside diameter of the pipe end C and an annular internal shoulder 14 for coming into abutment against an end face S of the pipe end C which shoulder projects into the chamber 13 from its end remote from the tubular wall 9.

The body 10 has a substantially frustoconical outer surface 15 disposed in the vicinity of the chamber 13 tapering towards the end 7.2 and extending in register with an internal surface 16 of corresponding shape in the endpiece 1. The frustoconical outer surface 15 is connected via its smaller section to the small section of a substantially frustoconical outer surface 17 of the end 7.2 whose large section at rest (see FIG. 2) is of a diameter greater than the inside diameter of the coupling section 3 close to the swelling 2. Thus, when the sleeve 7 is put into place in the coupling section 3, the end 7.2 is lightly clamped within the coupling section 3, at least in the large section portion of the frustoconical surface 17.

The retaining means 6 comprise a claw washer 18 clamped between an abutment bushing 19 bearing against a shoulder 20 of the coupling section 3 in question and against the end 7.1 of the sleeve 7, and a locking insert 21 engaged in conventional manner in the free end 4 of the coupling section 3 so as to press the claw washer 18 against the abutment bushing 19 and hold it in the coupling section 3. The claws of the washer 18 are elastically deformable between a retaining position in which the claws project into the inside of the coupling section 3 so as to engage the pipe end C when it is inserted into the coupling section 3, and a disengaged position in which the claws are retracted from their projecting position so as to define a through section that is slightly larger than the section of the pipe. The claws are brought into their projecting position by means of a pusher 26 slidably received in the locking insert.

The abutment bushing 19 has a tubular guide portion 22 for the pipe end C. This tubular guide portion 22 has an inside diameter that is slightly greater than the outside diameter of the pipe end C and an outside diameter that is substantially equal to the inside diameter or the ring 8 and of the tubular wall 9, and it is engaged therein. It will be understood that the ring 8 is pinched between the abutment bushing 19 and the annular surface 12 of the coupling section 3, and that the tubular portion 22 prevents the outer shoulder 11 from escaping radially relative to the annular surface 12. To further limit any risk of radial escape, the annular surface 12 has a substantially annular step (formed in the body thereof or added thereto) which penetrates into the outer shoulder 11, thereby compressing the anchor ring, or which is received in a plane groove formed in corresponding manner in the outer shoulder 11.

While connecting a pipe end C in a coupling section 3, the pipe end C is engaged in the coupling section 3. The pipe end C is then received in the chamber 13 and its end surface S is pressed against the shoulder 14, thereby elastically extending mainly the tubular wall 9 of the sleeve 7 (with the small thickness of the tubular wall making easier to deform than the other portions of the sleeve which are thicker, although this greater deformability could also be obtained by local treatment of the material or by using a more flexible material) until the end 7.2 of the sleeve comes close to the swelling 2 which forms an abutment against further lengthening of the sleeve 7. The swelling 2 is connected in this case to the inside surface of each coupling section 3 in a progressive manner by means of a substantially frustoconical surface which thus causes the end 7.2 to be deformed radially, thereby tending to compress the tubular body 10 against the pipe end C. By reaction, the friction between the end 7.2 and the endpiece increases, thus increasing the force that opposes insertion of the pipe end in the endpiece. Furthermore, in particular because of this progressive coupling, the adjacent zone of the swelling (in particular between the end 7.2 and the swelling) is thus easily accessible, thus making cleaning easier and limiting the dead volumes that might form retention zones. Nevertheless, the swelling 2 could be of some other shape.

The axially deformed tubular wall 9 tends to return to a rest state when the engagement force is released and/or the circuit is put under pressure. The claws of the claw washer 18 then wedge and penetrate into the outside surface of the pipe end C.

Because of its resilience, the sleeve 7 exerts a force on the pipe end C, thus maintaining close contact between the internal shoulder 14 of the sleeve 7 and the end surface S of the pipe end C. To improve this contact, the internal shoulder 14 can be of a convex frustoconical shape (i.e. having its apex directed towards the end 7.1, see FIG. 2) which is slightly compressed during insertion of the pipe end, or it can have an annular projection. Furthermore, while the sleeve 7 is being extended, the frustoconical surfaces 15 and 16 slide over each other and constitute means for radially shrinking the chamber 13 while maintaining the surface thereof in close contact with the outside surface of the pipe end C. Furthermore, by reaction, the force exerted by the pipe end C against the wall of the chamber 13 and the shoulder 14 tends to press the outside surface of the body 10, and in particular the frustoconical surface 17, against the inside surface of the coupling section 3. In addition, when the circuit is put under pressure, the liquid being conveyed exerts pressure on the end 7.2 of the sleeve 7, thereby pressing the shoulder 14 against the end surface S of the pipe end C and the outside surface of the end 7.2 against the inside surface of the coupling section 3. To improve the action of the liquid on the end 7.2, the end surface 23 of the end 7.2 is connected to the inside surface 24 thereof by a portion 25 that is curvilinear (as shown in the figures) or that is frustoconical.

These areas of close contact ensure that the coupling is leakproof.

Because of the elasticity of the sleeve 7, the contacts thus established between the pipe end, the sleeve, and the coupling section are maintained when forces are exerted on the pipe other than those due to the pressure of the liquid, for example bending forces tending to ovalize it. The influence of such forces on the sealing element is also limited by the tubular portion 22 of the abutment bushing 19 that serves to guide the pipe end C.

In the description below of the variant embodiment shown in FIGS. 3 and 4, elements that are identical or analogous to those described above are given identical numerical references.

As before, the connection device comprises an endpiece 1 having two coupling sections 3 and 4 each containing a coaxial sleeve 7 forming a resilient abutment 5, a claw washer 18 clamped between an abutment bushing 19 and a locking insert 21, and a pusher that is slidably received in the locking insert 21.

In this variant, the sleeve 7 has an outer setback 27 of substantially frustoconical shape with a large section connected to the tubular wall 9 and a small section connected to the small section of the frustoconical outer surface 17 either directly, or as shown herein, via a substantially cylindrical surface 28. The outer setback 27 is designed to co-operate with a corresponding inner setback 29 in the coupling section 3 so as to form an abutment against elongation of the wall 9. The inner and outer setbacks 29 and 27 can be of any shape that enables them to perform this function, and in particular they can have a radial annular shape or they can have a flare shape. Advantageously, the outer setback 27 and the inner setback 29 are arranged to ensure that the chamber 13 shrinks around the pipe end C while the pipe end is being inserted into the endpiece.

The end surface 23 is of substantially concave frustoconical shape (i.e. with its apex pointing towards the end 7.1) Thus, progressive coupling is contained between the inner surface 24 and the inner surface of the endpiece 1.

It will be observed that the portion of the inner surface of the endpiece that extends between the ends 7.2 is cylindrical and substantially smooth.

Thus, when pipes are coupled to the connection device, there is no sudden step in the surface or narrow setback in which the transported fluid might stagnate. This substantially eliminates any risk of the fluid that is being transported becoming contaminated by stagnant fluid that has spoilt, and cleaning is also facilitated.

Naturally, the invention is not limited to the embodiment described and variants can be made thereto without going beyond the ambit of the invention as defined by the claims.

In particular, the sleeve 7 can comprise a tubular body 10 provided externally with a shoulder bearing against a corresponding radial surface of the endpiece so as to fix the sleeve axially therein.

What is claimed is:

1. A device for connecting a pipe end to a member, the device comprising a tubular endpiece having a first end secured to the member and a second end through which the pipe end can be engaged in the endpiece, the endpiece being provided internally with an abutment against engagement of the pipe end and means for securing the pipe end in leakproof manner inside the endpiece, these means including a sealing element and means for retaining the pipe end inside the endpiece, wherein the device comprises a sleeve that is elastically deformable at least in an axial direction, which sleeve has means for fixing it axially in the endpiece and, towards the first end of the endpiece, an end provided with an annular internal shoulder for coming into contact against an end face of the pipe end and wherein the endpiece has an annular inner swelling providing an abutment against axial lengthening of the sleeve and cooperating with the end of the sleeve that is provided with the annular inner shoulder so as to form said abutment against engagement of the pipe end.

2. A device according to claim 1, wherein the sleeve is arranged to form the sealing element.

3. A device according to claim 2, wherein the sleeve has a chamber defined by a cylindrical inner surface adjacent to the inner shoulder to be pressed against an outer surface of the pipe end.

4. A device according to claim 3, wherein the diameter of the cylindrical inner surface is slightly smaller than the outside diameter of the pipe end.

5. A device according to claim 3, wherein the sleeve has an outer frustoconical surface in the vicinity of the cylindrical inner surface, the frustoconical surface tapering towards the first end of the endpiece to cooperate with an inner surface of complementary shape of the endpiece and form means for radially shrinking the cylindrical inner surface of the sleeve.

6. A device according to claim 1, wherein the sleeve has an end adjacent to the second end of the endpiece and provided with an outer shoulder to provide an axial abutment for the sleeve in the endpiece.

7. A device according to claim 1, wherein the endpiece has an inner setback to form an abutment against lengthening of the sleeve by cooperating with a corresponding outer setback of the sleeve.

8. A device according to claim 1, wherein the retaining means comprises a claw washer whose claws are clamped between an abutment bushing adjacent to the sleeve and a locking insert pressing the washer against the abutment bushing, and wherein the abutment bushing has a tubular guide portion with an inside diameter that is substantially equal to an outside diameter of the pipe end and extending in the end of the sleeve that is remote from the annular inner shoulder.

9. A device according to claim 1, wherein the sleeve has an end adjacent to the second end of the endpiece and provided with an outer shoulder to provide an axial abutment for the sleeve in the endpiece, wherein the tubular guide portion has an outside diameter substantially equal to the inside diameter of said end of the sleeve.

* * * * *